June 2, 1964 F. PAULIK ETAL 3,135,107
APPARATUS FOR THE DETERMINATION OF THE EVAPORATION CURVE
FOR LIQUIDS BY THE THERMOGRAVIMETRIC METHOD
Filed Dec. 28, 1960 3 Sheets-Sheet 1

INVENTORS
LASZLO ERDEY
FERENC PAULIK
JENO PAULIK

BY

ATTORNEY

INVENTORS
LASZLO ERDEY
FERENC PAULIK
JENO PAULIK

United States Patent Office 3,135,107
Patented June 2, 1964

3,135,107
APPARATUS FOR THE DETERMINATION OF THE EVAPORATION CURVE FOR LIQUIDS BY THE THERMOGRAVIMETRIC METHOD
Ferenc Paulik and Jenö Paulik, both of 7 Liptak Lajos Utca, and László Erdey, 16 Toldi Ferenc Utca, Budapest, Hungary
Filed Dec. 28, 1960, Ser. No. 78,951
1 Claim. (Cl. 73—17)

The determination of the evaporation curve for liquids according to known distillation methods is rather difficult and requires comparatively large quantities of liquids. In this method the liquid is evaporated in a distillation apparatus and the volume of the distillate condensed and collected in the cooler part of the apparatus is measured as a function of the temperature in the vapour space.

With the help of the method and apparatus according to the present invention the evaporation testing of liquids may be carried out quickly and accurately with very small amounts of liquid—even down to 0.5 to 1.0 g. The measurement departs from known practice by not determining the distillate volume but by a continual determination of the weight of liquid residue by means of a thermobalance and by determining the temperature of the escaping vapour by means of a thermocouple. Moreover, with the apparatus according to the invention the rate of evaporation and therefore the derivative of the change in weight curve can also be determined with the aid of a derivative device which measures with the speed of swinging of the balance. The derived weight curve itself indicates the smallest change of rate of evaporation in the form of highest or lowest values and offers a great help to the qualitative and quantitative evaluation of the weight curve.

The invention is a modification of the apparatus according to U.S. patent application Serial No. 700,442, and now Patent No. 3,045,472.

Figure 1:
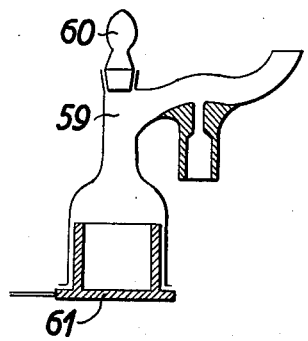
Figure 2:
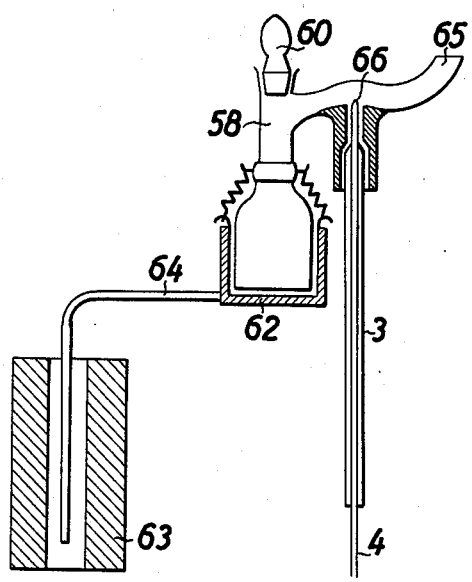
Figure 3:
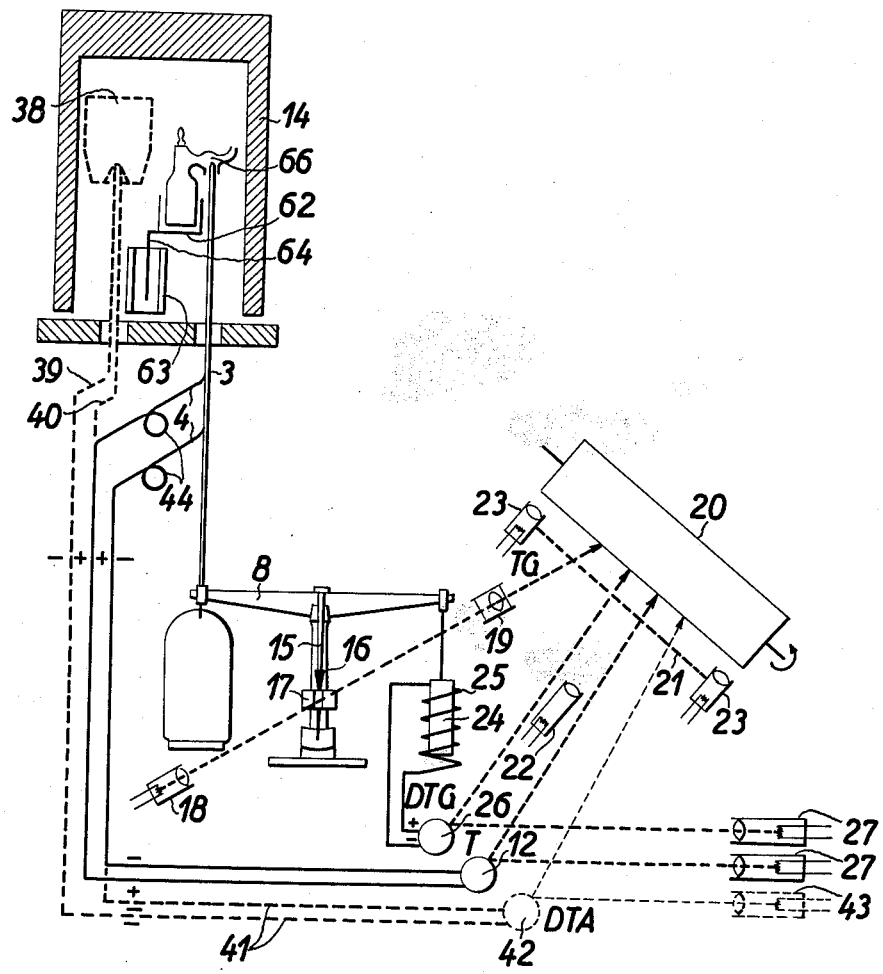
Figure 4:
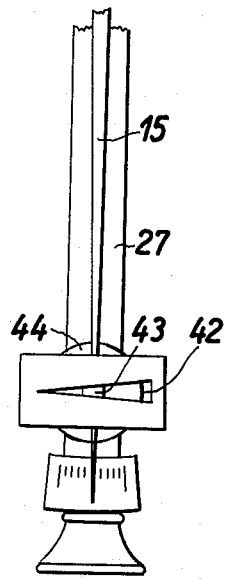
Figure 5:
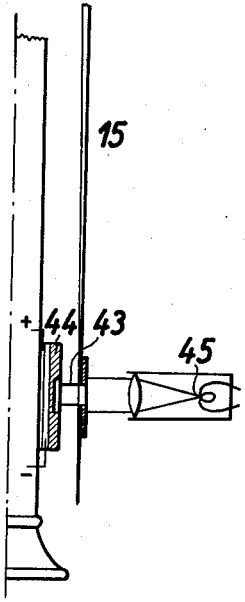
Figure 6:
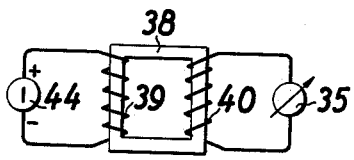
Figure 7:
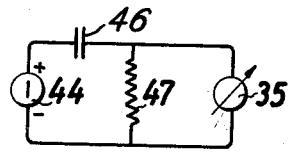

The invention may be further illustrated with reference to the accompanying drawings, in which:

FIGURE 1 shows the evaporation vessel in vertical section;
FIGURE 2 shows a modification of this evaporation vessel with adjacent parts of the apparatus;
FIGURE 3 is a diagrammatical view of the whole apparatus;
FIGURES 4 and 5 show a detail of the above, in two directions at right angles to one another;
FIGURES 6 and 7 show two different derivative circuits.

Evaporation testing of a liquid takes place by simultaneous measurement of the amount of change in weight of the liquid, the rate of this weight-change and the equilibrium temperature of the vapour escaping from the liquid. The liquid sample is held in an evaporation vessel 59 or 58 with a stopper 60. A dish of precious metal fits into vessel 59 from beneath, or, in the case of vessel 58, this vessel is placed in such a dish.

The dish is used to heat the vessels and the contained liquids. The heat energy is supplied from a nearby electrical heating means 63, via a conductive arm 64 of dish 61 or 62. The heating means lies to one side of the evaporation vessel to prevent the warm air stream, which rises up around the heating means, from exerting any lifting effect upon the vessel. The vessel loads the arm 8 of the beam in a thermobalance of the type known per se (FIGURE 3) by means of a porcelain rod 3 (with two passages bored along its length to hold the branches 4 of a thermocouple), so that the weight of the vaporised liquid escaping through the opening 65 (FIGURE 2) may be continually measured. Simultaneously the temperature of the escaping vapour may also be measured with the help of instrument 12 linked to the thermocouple, the soldered joint 66 of which is placed in the vapour filled space. The evaporation apparatus described is housed in an electrically heated oven 14 (FIGURE 3) the heater current of which must be so controlled that the temperature of the air surrounding the evaporation vessel stays a few degrees centigrade lower than the temperature of the vapour which is that measured by the thermocouple element. In this way overheating of the vapour is avoided and the equilibrium vapour temperature of the liquid vapour phase is measured rather than the temperature of the overheated vapour.

The conducting away of the current (44, FIGURE 3) of the thermocouple assembly mounted upon the balance beam must be carried out in such a way that the balance movements are not hindered. This can be done in a way free from torsion through fine metal filaments which are fastened in the direction of the swinging axis of the balance.

The sensitivity of the balance must be decreased, before beginning the measurement, in proportion to the change in weight anticipated and to the weight of liquid taken, so that the balance accommodates the whole change in weight within one swing. This decreasing of the balance sensitivity can be carried out, for example, with a calibrated control weight 16 placed on the balance pointer 15.

The swing of the balance may be recorded automatically most simply by fastening a slotted plate 17 to the balance pointer 15 illuminated by lamp 18, so that the amplitude of the light signals, magnified through an optical arrangement 19, is projected upon a photorecording roller 20. The temperature in the vapour space measured by the thermocouple and galvanometer 12 may equally well be recorded photographically upon the same photorecording roller 20. For easier interpretation of this photographic record, the light sensitive paper may be furnished (before or after the photographic readings) with a calibrated temperature and weight scale, by positioning an optical transparency 21 with divisions corresponding to the desired scale in front of the roller 20, and illuminating it by lamp 22, the roller 20 then being revolved. By means of lamps 23 placed one on each edge of the photographic record, time co-ordinates may be plotted, by actuating these lamps instantaneously by a clockwork quick-action switch at predetermined time intervals.

The derivation of the weight curve is carried out by means of an apparatus, as described in said aforementioned Patent No. 3,045,472, having for this purpose a permanent magnet or an electromagnet 24, either hanging from the balance beam with a fixed coil 25 surrounding it, or vice versa. The movable magnet induces in the coil an electrical voltage proportional to the derivative of balance movement. The light-beam of a galvanometer 26 connected to the poles of the coil is thrown by lamp 27 to the galvanometer mirror and acts as an indication of the derivative weight curve upon the light sensitive paper.

The velocity of change of weight may moreover be measured in the following fashion (FIGURES 4–5). A plate with a wedge-shaped slot 42 is fastened to the balance pointer 15, and behind this a photocell or light-element 44 is arranged, illuminated by a lamp 45 so that in this fashion a current proportional to the balance deflection is produced by a photoelectric method. If now this current produced is led into the primary winding 39 of a transformer (FIGURE 6) the derivative of the primary current is manifested in the secondary winding 40 and is measured by a galvanometer 35. Similarly, the derivative of the photoelectric current may be obtained with a condenser 46 and resistance 47.

In assembling the measuring apparatus a balance with a beam pivoting or suspended upon a knife edge, or a torsion balance or a spring balance may be used. The balance may be provided with an automatic weight registering device (doubled photocells, light elements, amplifier, photoelectrically controlled servomotor and a recording device linked thereto). The thermal analysis apparatus of the aforementioned application Serial No. 700,472 now Patent No. 3,045,472 may be used to advantage for carrying out measurements. This apparatus, the assembly of which is shown with the incorporation of the parts drawn with dashed lines in FIGURE 3 may be made suitable for the measurement simply by replacing a sample crucible by liquid sample in evaporation vessel 58, 59 and accommodating the small electrical heating means 63 for heating the metal basins 61 or 62 inside the oven 14 near the evaporation vessel. The apparatus already comprises measuring apparatus for several simultaneous determinations so that the parts unnecessary for these readings (38 to 43) may be simply switched off during these readings.

What we claim is:

Apparatus for the evaporation testing of a liquid, comprising weight-determining means including a movable member, an evaporation vessel for containing a liquid to be tested and for loading said means, heating means for heating the liquid, a thermocouple for measuring the temperature of vapor escaping from the liquid to be tested, the junction of said thermocouple being mounted relative to said vessel to sense the temperature of said vapor, and means coupled with said movable member of the weight-determining means for determining the derivative of the change in weight curve of the liquid.

References Cited in the file of this patent

UNITED STATES PATENTS

| | | |
|---|---|---|
| 2,588,355 | Burr et al. | Mar. 11, 1952 |
| 3,055,296 | Watson et al. | Sept. 25, 1962 |

FOREIGN PATENTS

| | | |
|---|---|---|
| 1,187,070 | France | Mar. 2, 1959 |

OTHER REFERENCES

Article by L. Erdley, Paulik & Paulik, published in Nature, vol. 174, Nov. 6, 1954, pp. 885, 886.

Article by D. A. Powell, published by Journal of Scientific Instruments, vol. 34, June 1957, pp. 225–227.

Article by Waters, published in Analytical Chemistry, vol. 32, No. 7, June 1960, pp. 852–858.